United States Patent
Hayashi

(10) Patent No.: US 9,740,444 B2
(45) Date of Patent: Aug. 22, 2017

(54) INFORMATION PROCESSING DEVICE THAT GENERATES REPORT FOR SETTING VALUES AFTER AN IMPORT

(71) Applicant: CANON KABUSHIKI KAISHA, Tokyo (JP)

(72) Inventor: Ruri Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/180,679

(22) Filed: Jun. 13, 2016

(65) Prior Publication Data
US 2016/0378412 A1    Dec. 29, 2016

(30) Foreign Application Priority Data
Jun. 24, 2015   (JP) .................. 2015-126873

(51) Int. Cl.
G06F 15/00 (2006.01)
G06F 3/12 (2006.01)
G06K 1/00 (2006.01)
H04N 1/00 (2006.01)

(52) U.S. Cl.
CPC .......... *G06F 3/1253* (2013.01); *G06F 3/1205* (2013.01); *G06F 3/1236* (2013.01); *H04N 1/00244* (2013.01); *H04N 1/00411* (2013.01); *H04N 2201/04* (2013.01)

(58) Field of Classification Search
CPC .... G06F 3/1253; G06F 3/1205; G06F 3/1236; H04N 1/00244; H04N 1/00411; H04N 2201/04
USPC ................... 358/1.1, 1.15, 1.13, 1.14
See application file for complete search history.

(56) References Cited

U.S. PATENT DOCUMENTS

2008/0025213 A1\* 1/2008 Gotou ................. H04L 12/5693
                                                                370/229
2015/0146227 A1\* 5/2015 Iwamoto ............... G06F 3/1239
                                                                358/1.13

FOREIGN PATENT DOCUMENTS

JP          2003-23580 A        1/2003

\* cited by examiner

*Primary Examiner* — Douglas Tran
(74) *Attorney, Agent, or Firm* — Fitzpatrick, Cella, Harper & Scinto

(57) ABSTRACT

An information processing device, comprises: an import unit that sets setting items of the information processing device all at once using import data designating a plurality of setting values; a generation unit that generates a report file regarding a result of an import performed by the import unit; and an output unit that outputs information of a setting item that is included in the report file generated by the generation unit and that has been determined as meeting predetermined conditions, wherein the predetermined conditions are that there is no change in setting value before and after the import performed by the import unit, and there is a difference between a setting value designated by the import data and a corresponding setting value after the import.

9 Claims, 14 Drawing Sheets

FIG. 4

| SETTING ITEM (Key) | IMPORT CONDITION | ROUNDING SPECIFICATION | COMPATIBLE Key |
|---|---|---|---|
| MANAGEMENT SETTINGS > LICENSE/OTHERS > ON/OFF OF REMOTE UI (device_settings.use_remote_ui) | — | — | — |
| DESTINATION SETTINGS > CHANGE DEFAULT DISPLAY OF ADDRESS BOOK (device_settings.addressbook_view) | Send LICENSE | — | — |
| CONFIGURATION > DISPLAY SETTINGS > SCREEN DISPLAYED AFTER ACTIVATION/RETURN (device_settings.common.view_func) | DESIGNATED APPLICATION IS INSTALLED | INITIAL SETTING (MAIN MENU) | — |
| CONFIGURATION > DISPLAY SETTINGS > DISPLAY NAME OF LOGGED IN USER (device_settings.system_management. username_disp) | — | — | device_settings. system_management. deptid_disp |

400

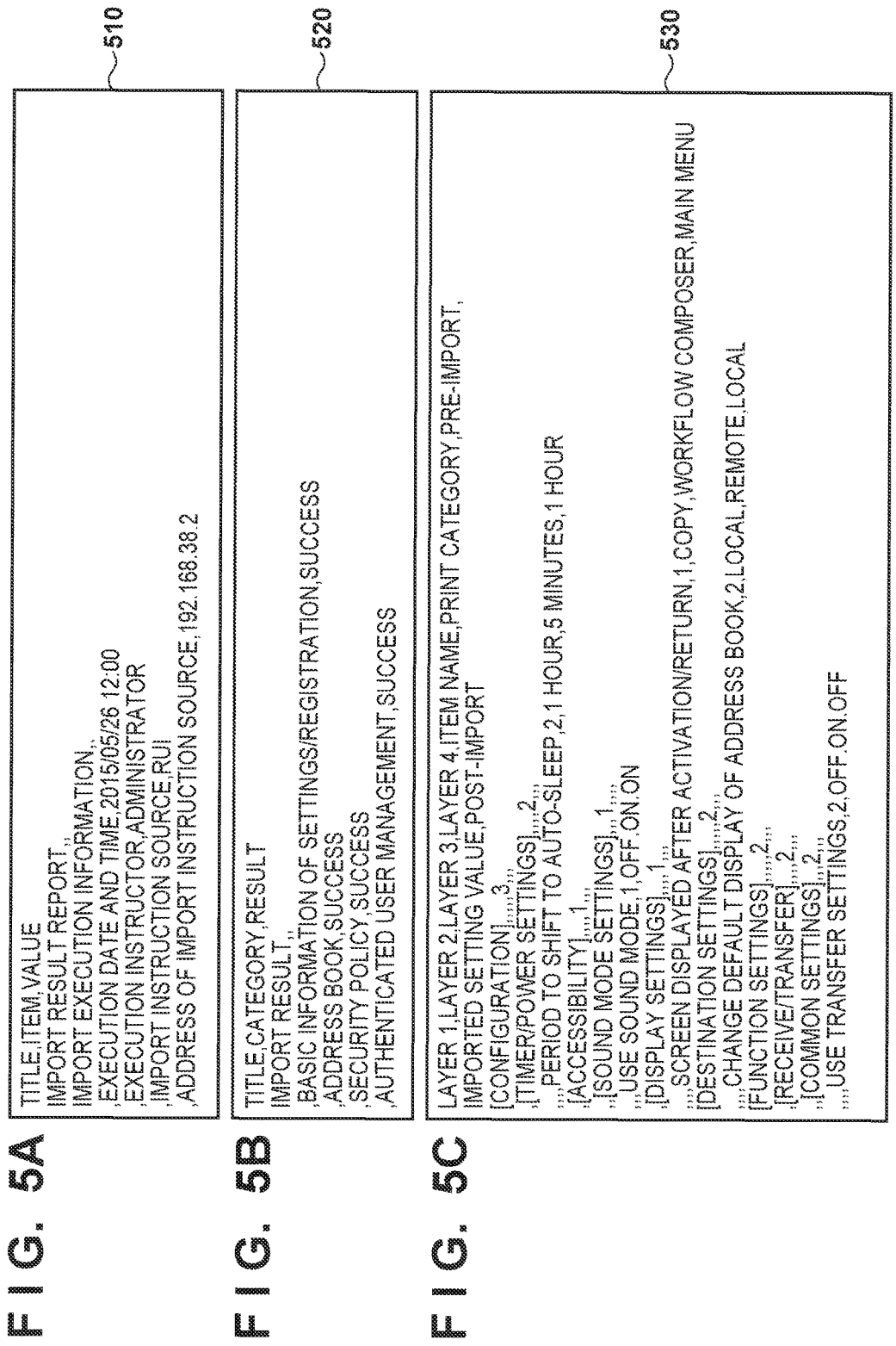

F I G. 6

| REFERENCE NUMBER | PRE-IMPORT SETTING VALUE | IMPORT DATA | POST-IMPORT SETTING VALUE | REASON | REPORT PRINT | REPORT FILE |
|---|---|---|---|---|---|---|
| P1 | 0 | 0 | 0 | - | - | ○ |
| P2 | 0 | 1 | 1 | - | ○(A) | ○ |
| P3 | 0 | 1 | 0 | OUTSIDE VALUE RANGE | ○(B) | ○ |
| P4 | 0 | 1 | 0 | import LEVEL | - | ○ |
| P5 | 0 | 1 | 0 | LICENSE/OPTION | ○(B) | ○ |
| P6 | 0 | 1 | 0 | SECURITY POLICY | ○(B) | ○ |
| P7 | NONE | 1 | NONE | NOT SUPPORTED | - | ○* |
| P8 | 0 | NONE | 0 | - | - | - |
| P9 | 0 | 1 | 2 | ROUNDING | ○(A) | ○ |

A: OUTPUT TO REPORT PRINT AS SETTING ITEM WITH CHANGED VALUE
B: OUTPUT TO REPORT PRINT AS SETTING ITEM WITH UNCHANGED VALUE
*: ALTHOUGH SETTING VALUE CANNOT BE DISPLAYED AS IT IS NOT SUPPORTED BY IMAGE FORMING DEVICE SERVING AS IMPORTING PARTY, ONLY KEY FOR HANDLING SETTING AND VALUE OF IMPORT DATA ARE LEFT IN REPORT FILE

F I G. 7

IMPORT RESULT REPORT

IMPORT EXECUTION INFORMATION

| | |
|---|---|
| EXECUTION DATE AND TIME | 2015/05/26 |
| EXECUTION INSTRUCTOR | Administrator |
| IMPORT INSTRUCTION SOURCE | RUI |
| ADDRESS OF IMPORT INSTRUCTION SOURCE | 192.168.38.2 |

IMPORT RESULT SUMMARY

| | |
|---|---|
| BASIC INFORMATION OF SETTINGS/REGISTRATION | SUCCESS |
| ADDRESS BOOK | SUCCESS |
| SECURITY POLICY | SUCCESS |
| AUTHENTICATED USER MANAGEMENT | SUCCESS |

DETAILS OF IMPORT WITH CHANGED VALUE

| SETTING ITEM | PRE-IMPORT SETTING VALUE | POST-IMPORT SETTING VALUE |
|---|---|---|
| [CONFIGURATION]<br>  [ACCESSIBILITY]<br>    [SOUND MODE SETTINGS]<br>      USE SOUND MODE | OFF | ON |
|   [DISPLAY SETTINGS]<br>    SCREEN DISPLAYED AFTER<br>    ACTIVATION/RETURN | COPY | MAIN MENU |

DETAILS OF IMPORT WITH UNCHANGED VALUE

| SETTING ITEM | PRE-IMPORT SETTING VALUE | POST-IMPORT SETTING VALUE |
|---|---|---|
| [CONFIGURATION]<br>  [TIMER/POWER SETTINGS]<br>    PERIOD TO SHIFT TO AUTO-SLEEP | 1 HOUR | 1 HOUR |
| [DESTINATION SETTINGS]<br>  CHANGE DEFAULT DISPLAY OF<br>  ADDRESS BOOK | LOCAL | LOCAL |
| [FUNCTION SETTINGS]<br>  [RECEIVE/TRANSFER]<br>    [COMMON SETTINGS]<br>      USE TRANSFER SETTINGS | OFF | OFF |

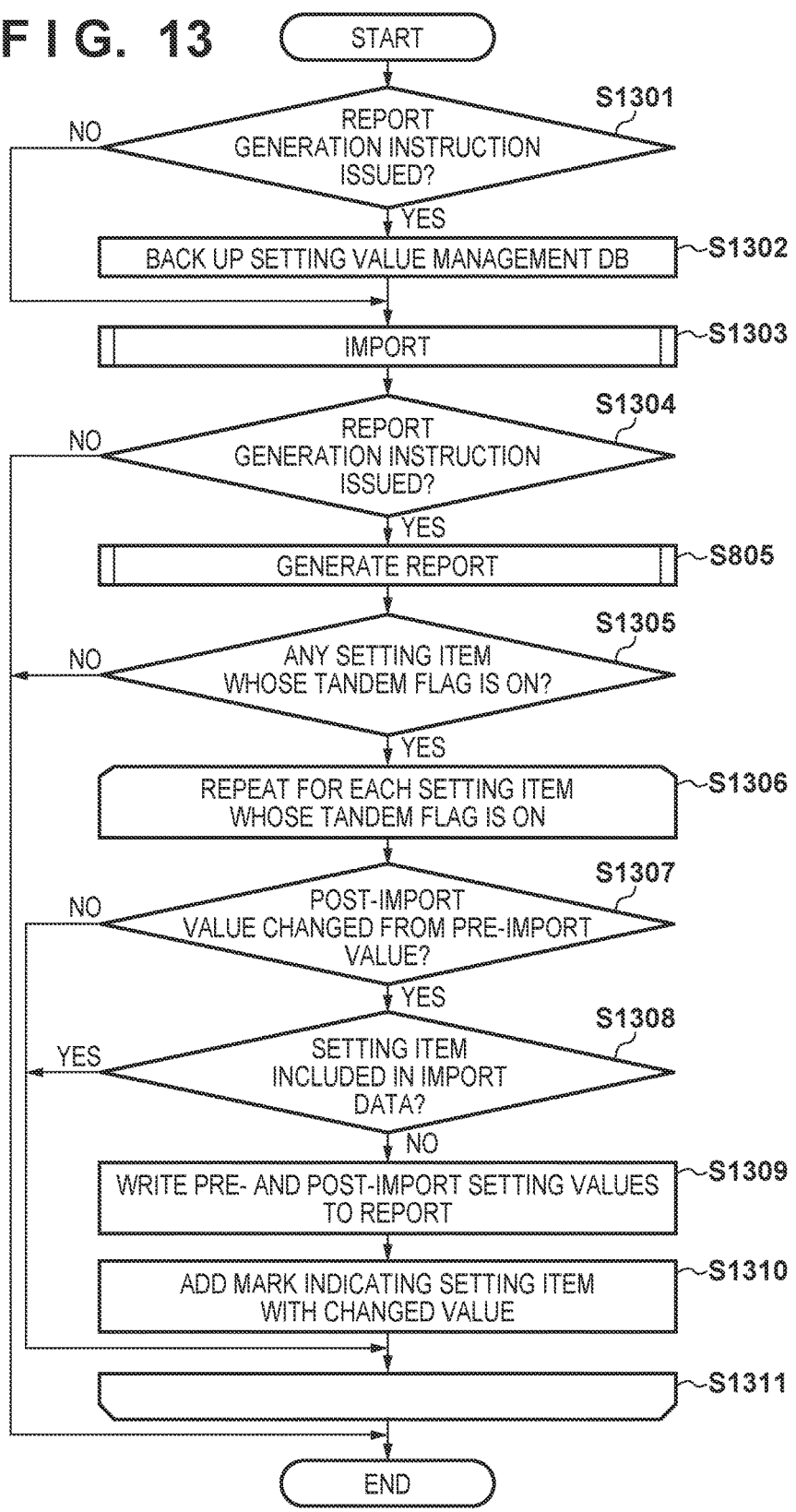

INFORMATION PROCESSING DEVICE THAT GENERATES REPORT FOR SETTING VALUES AFTER AN IMPORT

BACKGROUND OF THE INVENTION

Field of the Invention

The present invention relates to an information processing device, a method of controlling the same, and a non-transitory computer-readable medium.

Description of the Related Art

In recent years, the number of setting items has increased following image forming devices becoming more multi-functional. In order to reduce the workload of manually configuring setting values on each individual device, a mechanism is provided that performs setting all at once by importing and exporting information of setting values.

On the other hand, some items in image forming devices require that conditions be satisfied in order for their setting values to be reflected, such as an item that cannot be set if a license is not installed, and an item that is not displayed if an external finisher is not attached. Furthermore, some setting items have settable value ranges that vary with each model. For example, in order to set up two image forming devices that reflect the same setting values, one of the image forming devices is set up first. Thereafter, if setting values of the image forming device that has been set up are exported and the exported setting values are imported by the other image forming device, the presence of the aforementioned conditions for reflecting setting values may prevent the setting values of some setting items from being reflected. A worker cannot grasp setting items that have been reflected as intended and setting items that have not been reflected as intended, unless he/she actually checks the setting values of the image forming devices on an item-by-item basis. Furthermore, as the image forming devices have an enormous number of setting values, the workload of checking whether all setting values have been reflected as intended is large.

There is a conventionally proposed technique of holding a history of items with changed setting values and displaying only the changed setting values to reduce the work of checking setting values (Japanese Patent Laid-Open No. 2003-23580). By referencing a history list showing the changed setting values, a worker can recognize past set items, and perform a check without using a hierarchical menu.

With the related art, as items with changed setting values are held as a history list, the changed setting values can be checked on the list without using a hierarchical menu. However, in importing setting values, the list does not show setting items whose values have not been reflected due to a failure to satisfy conditions for reflecting settings.

Setting items whose setting values have not been reflected as intended, despite the import of the setting values, may require a worker to perform additional work after the import of the setting values, such as the configuration of preliminary settings for reflecting the setting values and the setting of near values in the absence of settable values. In view of this, it is desirable to check such setting items whose setting values have not been reflected as intended, without incurring the workload. However, there is the problem that a user cannot determine whether the intended values have been reflected unless he/she checks every single item using a hierarchical menu.

SUMMARY OF THE INVENTION

According to one aspect of the present invention, there is provided an information processing device, comprising: an import unit configured to set setting items of the information processing device all at once using import data designating a plurality of setting values; a generation unit configured to generate a report file regarding a result of an import performed by the import unit; and an output unit configured to output information of a setting item that is included in the report file generated by the generation unit and that has been determined as meeting predetermined conditions, wherein the predetermined conditions are that there is no change in setting value before and after the import performed by the import unit, and there is a difference between a setting value designated by the import data and a corresponding setting value after the import.

According to another aspect of the present invention, there is provided a method of controlling an information processing device, the method comprising: importing in which setting items of the information processing device are set all at once using import data designating a plurality of setting values; generating a report file regarding a result of an import performed in the importing; and outputting information of a setting item that is included in the report file generated in the generating and that has been determined as meeting predetermined conditions, wherein the predetermined conditions are that there is no change in setting value before and after the import performed by the importing, and there is a difference between a setting value designated by the import data and a corresponding setting value after the import.

According to another aspect of the present invention, there is provided a non-transitory computer-readable medium storing a program that causes a computer to function as: an import unit configured to set setting items of the computer all at once using import data designating a plurality of setting values; a generation unit configured to generate a report file regarding a result of an import performed by the import unit; and an output unit configured to output information of a setting item that is included in the report file generated by the generation unit and that has been determined as meeting predetermined conditions, wherein the predetermined conditions are that there is no change in setting value before and after the import performed by the import unit, and there is a difference between a setting value designated by the import data and a corresponding setting value after the import.

The present invention enables a user to clearly recognize a setting item in which an imported setting value has not been reflected.

Further features of the present invention will become apparent from the following description of exemplary embodiments (with reference to the attached drawings).

BRIEF DESCRIPTION OF THE DRAWINGS

FIG. 4 shows an exemplary structure of a specification management table.

FIGS. 5A to 5C show examples of an import result report file.

FIG. 6 illustrates a specification of the import result report.

FIG. 7 shows an example of an import result report print.

FIG. 13 is a flowchart of processing for generating the import result report file according to the second embodiment.

DESCRIPTION OF THE EMBODIMENTS

Figure 1:
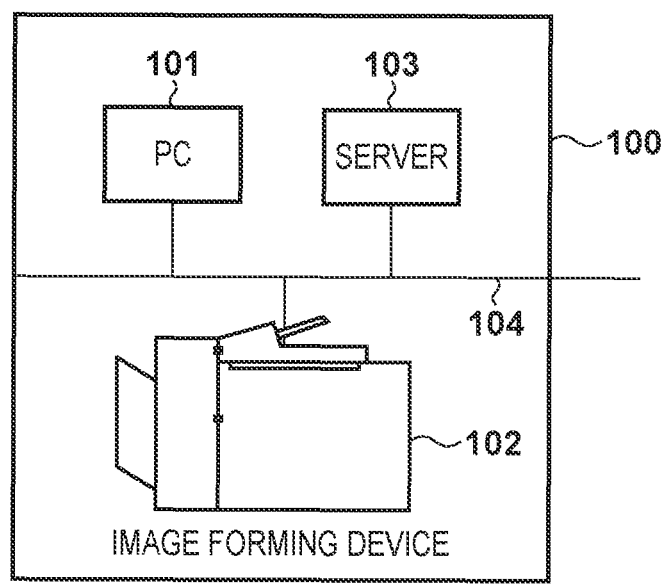
FIG. 1 shows an exemplary overall configuration of a system according to the invention of the present application.

The following describes embodiments of the present invention with reference to the drawings.

Definitions of Terms

First, terms used in the specification of the present application will be defined.

An "export" indicates an action where a device outputs setting values related to the device all at once, to the outside. Note that an item to be exported may be designated by a user, and arbitrary groups (categories) of setting items may be exported on a per-group (category) basis, for example.

"Export data" denotes data made up of a group of setting values exported from a device. No particular restriction is intended regarding a data format of export data. Specifically, export data includes settings of an address book and an administrator, network settings, and so on.

An "import" indicates an action where a device obtains setting values from outside and reflects the obtained setting values as setting values of the device.

"Import data" denotes data describing a group of setting values that have been received by a device through an import. For example, settings of a first image forming device can easily be configured in a second image forming device by importing export data that has been exported from the first image forming device to the second image forming device. Here, the export data that has been exported from the first image forming device is the same as import data that is imported to the second image forming device.

An "in-device application" denotes an application originally installed in a device. For example, an image forming device has a "copy application," a "box application," and a "send application" as in-device applications that cause "copy," "box," and "send" functions to run, respectively.

A "common setting value database" denotes a database of common setting values that integrally manages, among setting values held in a device, setting values managed by a plurality of applications in the device. The plurality of applications in the device can refer to and reflect setting values using a common mechanism.

A "category" denotes a unit of setting values used in an export/import of setting values from a device. For example, an "address book," "main menu settings," and the like are categories of import/export functions.

An "import result report" denotes a report for outputting the details of the result of importing setting values (import data) to a device. In the present specification, the import result report that has been output as a file is referred to as an "import result report file," whereas a printout of the import result report is referred to as an "import result report print".

An "import level" denotes an import condition that is managed on a per-setting item basis. Specifically, the following three patterns are managed as conditions: "only data exported from the same device can be imported," "only data exported from devices of the same model can be imported," and "data exported from any device can be imported". In a later description, the condition "only data exported from the same device can be imported" is expressed as "Lv1". Similarly, the condition "only data exported from devices of the same model can be imported" is expressed as "Lv2," and the condition "data exported from any device can be imported" is expressed as "Lv3". Note that these import conditions are examples, and other conditions can be used.

"Rounding" denotes a process to, in importing a setting value, set a value different from a value designated by import data. For example, when a value designated by import data cannot be set in a device serving as an importing party, the nearest setting value that can be set in the device or a default setting value is set through the rounding process.

"Tandem" denotes the rewriting a value of a certain setting item at the same time as the writing of a value of another setting item. For example, when "0" is set as a "forced timeout period" under security policy settings, "0" is set as a "period to shift to auto-clear" in tandem with the forced timeout period, even if the setting of the "period to switch to auto-clear" has not been explicitly changed.

Note that terms other than the terms described above will be described hereinafter as appropriate.

First Embodiment

[System Configuration]

FIG. 1 illustrates an exemplary overall configuration of a system 100 including an image forming device that operates as an information processing device according to one or more embodiments of the present invention.

The present invention operates both in an environment where the image forming device is connected to a network, and in an environment where the image forming device uses, for example, a USB memory and is not connected to the network. The system 100 includes an image forming device 102, a PC 101, and a server 103, and these constituent elements are connected to a LAN 104, which includes a network device (not shown), in such a manner that they can communicate.

The image forming device 102 reflects imported setting values in accordance with an import instruction from the PC 101 and the server 103, and with an import instruction from a manipulation unit 212 of the image forming device 102. The image forming device 102 also generates, as a result of importing setting values, an import result report file indicating setting values that have been imported and reflected, as well as setting values that have not been reflected. The PC 101 and the server 103 obtain the generated import result report file via a USB memory and the network. Furthermore, an import result report is printed in accordance with an instruction from the manipulation unit 212.

As the PC 101 and the server 103 can be general-purpose information processing devices and are not limited to particular devices in the present invention, a description of their hardware and software configurations will be omitted. Although the number of each type of connected constituent element is one in the example of FIG. 1, no restriction is intended in this regard, and the number of each type of connected constituent element may be more than one.

[System Configuration]

Figure 2:
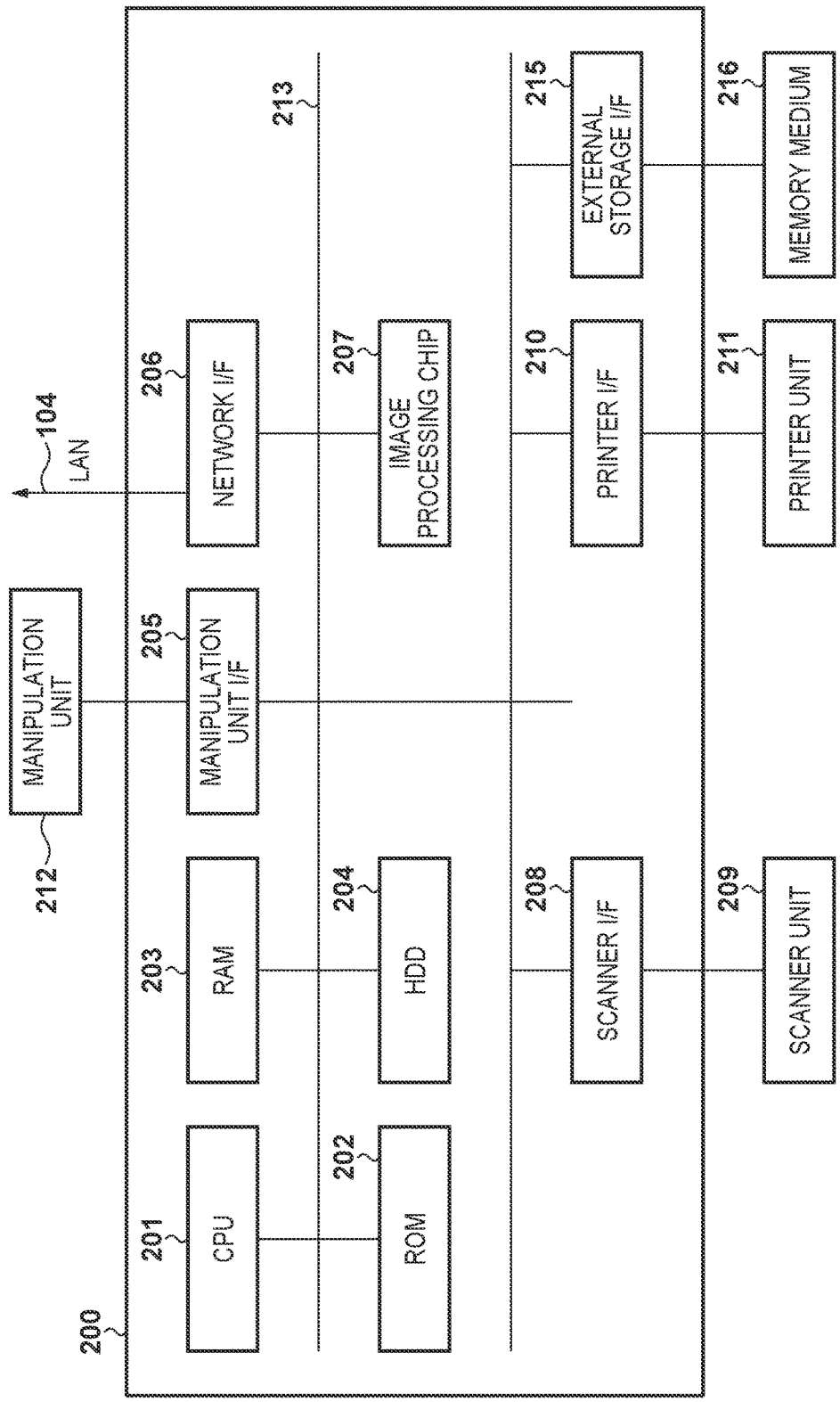
FIG. 2 shows an exemplary hardware configuration of an image forming device.

FIG. 2 shows an exemplary configuration of the image forming device 102 included in the system 100.

A control unit 200 includes a CPU 201, and integrally controls the operations of the image forming device 102. The CPU 201 executes various types of control processing by reading out control programs stored in, for example, a ROM 202. The ROM 202 is a non-volatile storage area, and stores, for example, a boot program for the image forming device 102. A RAM 203 is used as a system working memory for the operations of the CPU 201, and as a memory for temporarily storing image data. The RAM 203 is constituted by, for example, an SRAM that keeps holding stored contents after a power OFF, or a DRAM from which stored contents are deleted after a power OFF. An HDD 204 is a non-volatile storage area, and stores image data, various types of programs, or various types of information tables.

A manipulation unit I/F 205 is an interface unit for establishing connection between a system bus 213 and the manipulation unit 212. The manipulation unit I/F 205 outputs image data to be displayed on the manipulation unit 212 to the system bus 213, and outputs information input from the manipulation unit 212 to the system bus 213. The manipulation unit 212 includes a display unit (e.g., a liquid crystal display unit with a touchscreen function) and a keyboard. A network I/F 206 performs information input/output by connecting to the LAN 104 and the system bus 213. A scanner I/F 208 corrects, processes, and edits image data received from a scanner unit 209. Note that the scanner I/F 208 also determines, for example, whether the received image data pertains to a color original or a monochrome original, and whether the received image data pertains to an original including text or an original including a photograph. Then, the scanner I/F 208 appends the determination result to the image data. Such appended information is referred to as "attribute data".

A printer I/F 210 receives image data transmitted from an image processing chip 207, and applies image processing to the image data with reference to attribute data appended to the image data. The resultant image data obtained through the image processing is transferred from the control unit 200 to a printer unit 211 serving as a printing unit, via the printer I/F 210, and then printed onto a recording medium in the printer unit 211. An external storage I/F 215 is connected to a memory medium 216, and is used in storing data and images in the device to the memory medium 216, or in writing data in the memory medium 216 to the device.

[Exemplary Configurations of Software Functions of System]

Figure 3:
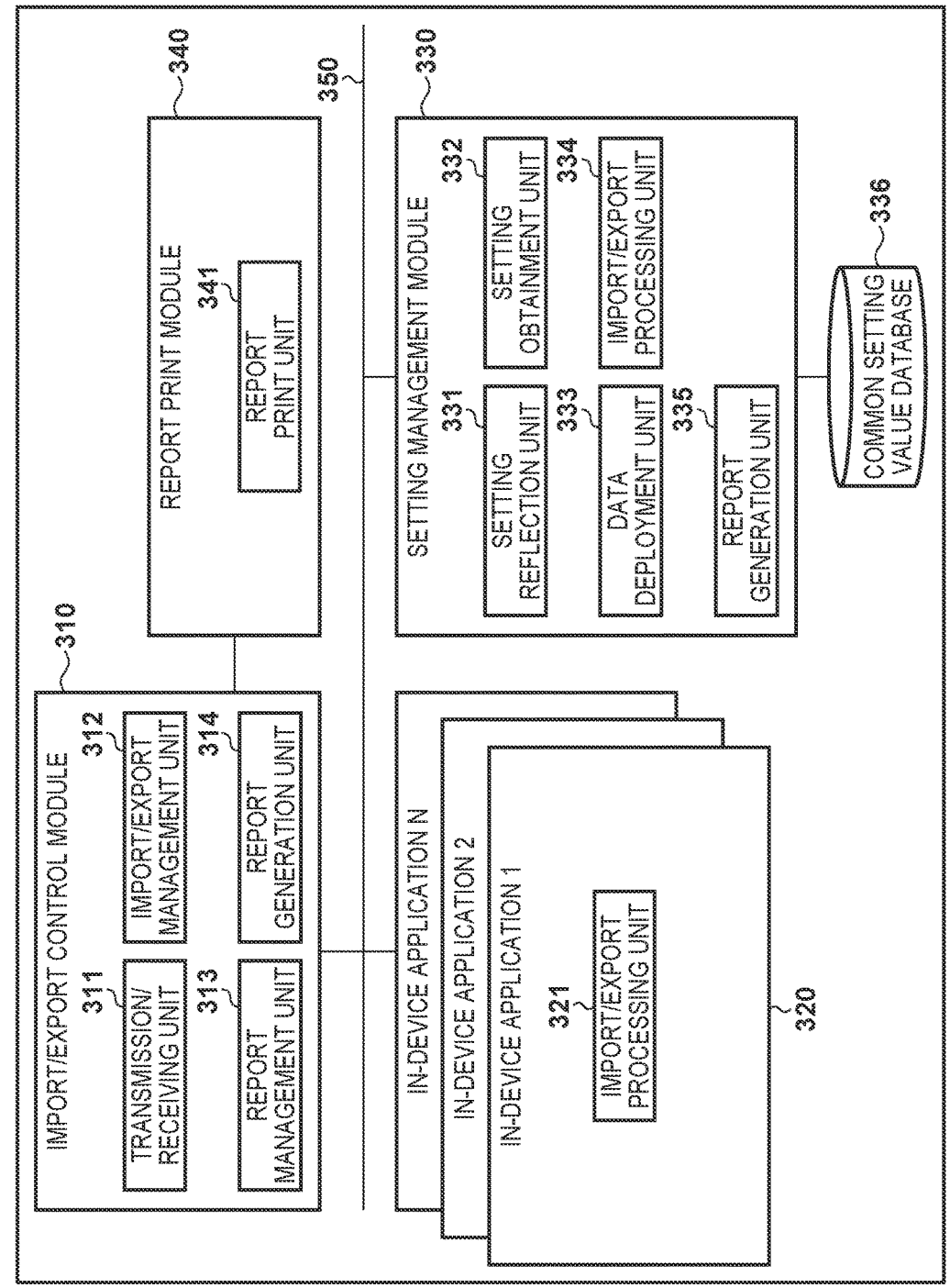
FIG. 3 shows an exemplary software configuration of the image forming device.

FIG. 3 shows an exemplary software configuration of the image forming device 102. Software according to the present embodiment is stored in the ROM 202 as a program, and executed by the CPU 201 loading the software to the RAM 203. Below, among software modules that are necessary for the image forming device 102 to function, only modules that are necessary for constituent requirements of the present invention will be selectively described.

An import/export control module 310 reflects import data, and executes processing for exporting setting values in the image forming device 102 as export data.

When executing export processing, an import/export management unit 312 of the import/export control module 310 instructs an in-device application(s) 320 that manages setting values of a designated category to perform an export. In the in-device applications 320, an import/export processing unit 321 obtains setting data in the device, which is held in a common setting value database 336, from a setting obtainment unit 332 via a setting management module 330. Obtained setting values are registered in a temporary database (not shown) as values to be exported via an import/export processing unit 334 of the setting management module 330.

Upon completion of processing for registering the setting values to be exported in the temporary database, the import/export processing unit 334 of the setting management module 330 changes the format of the registered data to an exportable format. Furthermore, the import/export management unit 312 of the import/export control module 310 collects data whose format has been changed to an exportable format into an export file. Thereafter, a transmission/receiving unit 311 of the import/export control module 310 executes processing for transmitting the data to an external terminal via the network I/F 206, or for storing the data to the memory medium 216 via the external storage I/F 215.

When executing import processing, the transmission/receiving unit 311 of the import/export control module 310 obtains import data via the network I/F 206 or the external storage I/F 215. When a report generation instruction is received during the import, a report management unit 313 instructs the setting management module 330 to back up the pre-import common setting value database 336. Subsequently, the import/export management unit 312 instructs the setting management module 330 to deploy the import data in a format readable from the in-device applications 320. Upon receiving the instruction, a data deployment unit 333 of the setting management module 330 temporarily deploys the import data to a database in a format that is readable to the in-device applications 320.

With reference to the deployed import data, the import/export management unit 312 of the import/export control module 310 instructs an in-device application(s) 320 that manage setting values of a category included in the import data, to perform an import. In the in-device application(s) 320 that has received the instruction, the import/export processing unit 321 obtains import data of the setting values managed therein from the import/export processing unit 334 of the setting management module 330. Subsequently, the import/export processing unit 321 of the in-device application(s) 320 stores values of the obtained import data to the common setting value database 336 via a setting reflection unit 331. The setting items managed by the in-device applications 320 are configured as an import specification management table 400 shown in FIG. 4, on a per-application basis. The import specification management table will be described later in detail.

In the in-device applications 320, the import/export processing unit 321 successively, from one setting item to another, checks whether the import data includes setting values corresponding to setting items managed in the import specification management table 400. Import processing is executed while checking whether the setting items included in the import data have an import condition and a rounding specification. With regard to setting items that do not have an import condition and a rounding specification, the import/export processing unit 321 of the in-device applications 320 stores obtained import data, as-is, to the common setting value database 336 via the setting reflection unit 331. With regard to setting items that have an import condition and a rounding specification, the import/export processing unit 321 determines whether the image forming device 102 is in a state where the import can be performed. If the image forming device has been determined to be in a state where the import can be performed, the import/export processing unit 321 changes the obtained import data in accordance with the rounding specification, and stores the resultant import data to the common setting value database 336 via the setting reflection unit 331.

If the import data does not include managed setting items, the import/export processing unit 321 checks whether there are setting items that are compatible with the managed setting items in accordance with the import specification management table 400. If there are compatible setting items, the import/export processing unit 321 queries the import/export processing unit 334 of the setting management module 330 as to whether the import data includes setting values corresponding to the compatible setting items. If the import data includes setting values corresponding to the compatible setting items, the import/export processing unit 321 stores the values corresponding to the compatible setting items in the import data to the common setting value database 336 as values of original setting items.

The import/export processing unit 321 also stores the values in the import data, in correspondence with keys of the original setting items, to the database to which the import data is being deployed via the import/export processing unit 334 of the setting management module 330. The keys denote identification information for managing setting items in the device. In this way, the import data is held together with the original setting items, and a change can be left in an import result report.

A description is given below of setting values managed in the import specification management table 400 shown in FIG. 4. Note that the import specification management table 400 is not limited to having the structure shown in FIG. 4, and may have other structures.

When any in-device application 320 receives an import instruction, the import/export processing unit 321 executes import processing with respect to four setting items managed in the import specification management table 400 shown in FIG. 4.

First, import processing is executed with respect to the "management settings>license/others>ON/OFF of remote UI" setting. The import/export processing unit 321 obtains the "management settings>license/others>ON/OFF of remote UI" setting in import data via the import/export processing unit 334. If the import data does not include this setting, import processing is continued with respect to the next setting. If the import data includes this setting, the obtained value in the import data is stored, as-is, to the common setting value database 336 via the setting reflection unit 331, because this setting does not have an import condition and a rounding specification.

Subsequently, the import/export processing unit 321 executes import processing with respect to the "destination settings>change default display of address book" setting. The "destination settings>change default display of address book" setting can be imported on the condition that a send license is installed. The import/export processing unit 321 of the in-device applications 320 checks whether the send license has been set in the image forming device 102. If the send license has been set, the import/export processing unit 321 stores the import data obtained from the import/export processing unit 334 of the setting management module 330 to the common setting value database 336 via the setting reflection unit 331. If the send license has not been set, the "destination settings>change default display of address book" setting is not imported.

Subsequently, the import/export processing unit 321 executes import processing with respect to the "configuration>display settings>screen displayed after activation/return" setting. To import the "configuration>display settings>screen displayed after activation/return" setting, the import/export processing unit 321 checks the values in the import data obtained from the import/export processing unit 334 of the setting management module 330. The import/export processing unit 321 determines whether an application set in the obtained import data is already installed in the image forming device 102. If the application set in the import data is already installed, the import/export processing unit 321 stores the import data obtained from the import/export processing unit 334 of the setting management module 330 to the common setting value database 336 via the setting reflection unit 331. If the application set in the import data is not installed in the image forming device 102, the import/export processing unit 321 rounds the import data to a "main menu" setting, which is an initial value, and stores the rounded import data to the common setting value database 336.

Subsequently, the import/export processing unit 321 executes import processing with respect to the "configuration>display settings>display name of logged in user" setting. As the import data does not include the "configuration>display settings>display name of logged in user" setting, the import/export processing unit 321 of the in-device applications 320 cannot obtain a value of this setting even if it attempts to obtain the value. Referring to the import specification management table 400, this setting item has a compatible key. Therefore, the import/export processing unit 321 attempts to re-obtain the import data using the key, that is, "device_settings.system_management.deptid_disp". If the re-obtainment of the import data fails, it indicates that the import data does not include data of this setting item, and hence processing is skipped. If the import data is obtained using the compatible key, the import/export processing unit 321 stores the obtained value to the common setting value database 336 as the "configuration>display settings>display name of logged in user" setting.

Furthermore, in order to leave the import result of the "configuration>display settings>display name of logged in user" setting in the import result report, the import/export processing unit 321 makes an arrangement as if the import data includes the "configuration>display settings>display name of logged in user" setting. The import/export processing unit 321 stores the value that is included in the import data as the "device_settings.system_management.deptid_disp" setting key to the database to which the import data is deployed, as a key of the "configuration>display settings>display name of logged in user" setting. Although the in-device applications 320 hold a key that is compatible with the settings in the foregoing example, tables of setting items that are partially compatible are collectively managed by the setting management module 330.

Upon completion of import processing with respect to setting values managed by the in-device applications 320, the report management unit 313 outputs, to a report generation unit 314, an instruction to generate a report related to information of an environment during the import, as well as a report related to summary information of the import result. The report generation unit 314 generates an import result environment report file and an import result summary report file. The report management unit 313 also issues an instruction to generate an import result detail report file to a report generation unit 335 of the setting management module 330.

The report generation unit 335 generates the import result detail report file by comparing the common setting value database that was backed up before the import, the post-import common setting value database, and the database to which the import data has been temporarily deployed. In generating the import result detail report file, the report generation unit 335 converts keys that are internally managed in correspondence with compared setting items, into the wording of setting items displayed by the manipulation unit, and then outputs the wording.

The generated import result report file is interpreted by a report print unit 341 of a report print module based on an instruction from the manipulation unit 212, and then printed via the printer unit 211. In the present embodiment, printing out is also performed with respect to a setting item that satisfies the following predetermined conditions: (1) there is no change in setting value before and after the import, and (2) there is difference between the setting value in the import data and the setting value after the import.

[Import Result Report File]

FIGS. 5A to 5C show exemplary structures of the import result report file according to the present embodiment. The import result report file is composed of the following three files. The first file is an import result environment report file 510 that indicates the environment during the import. The second file is an import result summary report file 520 that indicates a summary of the import result on a per-category basis. The third file is an import result detail report file 530 that indicates a pre-import setting value, a post-import setting value, and an imported setting value of each of imported setting items.

FIG. 5A shows an example of the import result environment report file 510. This report indicates the date and time of completion of the import, information of a user who executed the import, the path of an import instruction, and a piece of environment information of an IP address of an instruction source that remotely issued the import instruction. A title is appended to each piece of information. This report is a comma-separated values (CSV) file in which commas are used as separators, and thus can be filtered when opened.

FIG. 5B shows an example of the import result summary report file 520. This report indicates summary information of the import result of a category to be imported. For example, this report indicates a summary result showing whether the import of a category "basic information of settings/registration" resulted in a "success" or "failure".

FIG. 5C shows an example of the import result detail report file 530. This report shows in correspondence with an item name of an imported setting item on a UI, a pre-import setting value, an imported setting value, a post-import setting value, and detail information at the time of report printing. An import result report print is obtained through print processing with reference to the import result report file. Therefore, information indicating whether each setting item described in the import result detail report file is to be included in the import result report print is added to the import result report file. Furthermore, generation of the report file involves adding information indicating whether the items have different values before and after the import, and whether the items have the same value before and after the import, despite the import of setting values.

With reference to FIG. 6, a description is given below of patterns for leaving information as the import result report file, and patterns for outputting information as the import result report print. FIG. 6 shows an exemplary specification of the import result report. The following describes reference numbers P1 to P9 shown in FIG. 6 in order.

P1 is a pattern in which a setting value to be imported was set in the image forming device 102 before the import. In this case, information is left in the import result detail report file, but is not output to the import result report print; therefore, generation of the import result detail report file involves adding a mark indicating that the information is not to be printed. Note that the mark denotes setting of a flag or a predetermined setting value.

P2 is a pattern in which a post-import setting value has changed from a pre-import setting value along with registration of an imported setting value in the common setting value database 336. In this case, a setting item is output to the import result report print as a setting item with a changed value, and thus generation of the import result detail report file involves adding a mark indicating the "setting item with a changed value".

P3 is a pattern in which a value included in import data cannot be set because the value is outside a value range set in the image forming device 102 serving as an importing party. For example, it is assumed that the model of an image forming device that has exported the import data allows "5, 10, 15, 30, 40, and 50 minutes, 1 hour, 90 minutes, and 2, 3, and 4 hours" to be set as a "period to shift to auto-sleep". Also it is assumed that the image forming device 102 serving as the importing party allows "10 seconds, 1, 2, 10, 15, 20, 30, 40, and 50 minutes, 1 hour, 90 minutes, and 2, 3, and 4 hours" to be set as the "period to shift to auto-sleep". This pattern corresponds to a case in which the import cannot be performed because "5 minutes," which cannot be set in the image forming device 102 serving as the importing party, is set in the image forming device that has exported the import data. In the case of P3, a setting item is output to the import result report print as a setting item with an unchanged value, and thus generation of the import result detail report file involves adding a mark indicating the "setting item with an unchanged value".

P4 is a pattern in which a value included in the import data has not been imported due to an import level. For example, an "IP address" is a setting item under "Lv1" indicating that the image forming device 102 cannot import data other than data exported from itself. P4 is deemed an operation compliant with the specifications, and there is no output to the import result report print. Thus, generation of the import result detail report file involves adding a mark indicating that printing is not to be performed.

P5 is a pattern in which the import is not performed because the image forming device 102 serving as the importing party has not installed a license to reflect settings or does not have an option. For example, the "default display of address book" setting can be reflected only in an image forming device in which send license is installed. If the send license is not installed in the image forming device 102 serving as the importing party, the setting is not reflected.

P6 is a pattern in which a setting value is forcibly rounded in an image forming device in which a security policy has been set, that is to say, a setting value cannot be changed. For example, when the setting to "prohibit automatic transfer" is "ON" under the security policy settings, the setting to "use transfer settings" cannot be changed to "ON". In this case, if "ON" is imported as the setting to "use transfer settings," the setting value is not reflected.

In the cases of P5 and P6, a setting item is output to the import result report print as a setting item with an unchanged value, and hence generation of the import result detail report file involves adding of a mark indicating the "setting item with an unchanged value".

P7 is a pattern in which an imported setting value is set in an image forming device serving as an exporting party, but is not supported by the image forming device 102 serving as the importing party. As supported setting values vary with each model of image forming devices, the pattern like P7 may occur if a setting value is imported between image forming devices of different models. In the case of this pattern, as a setting value is not supported by the image forming device 102 serving as the importing party, the wording to be displayed on the UI is not supported, and the setting value is not shown in the import result report print. A key and a value for handling the import data are output to a file that is different from the import result detail file.

P8 corresponds to a setting value that is supported by the image forming device 102 but is not included in the import data. As this setting value is not imported, it is not supported as the import result report.

P9 is a pattern in which, in reflecting a value of the import data in the common setting value database 336, the value is stored to the common setting value database 336 as a different value due to a certain condition. For example, it is assumed that an application called "Workflow Composer" is registered in the import data as a value of "screen displayed after activation/return". This setting item allows for setting of installed applications; and if Workflow Composer is not installed in the image forming device 102 serving as the importing party, the initial value "main menu" is set. Therefore, provided that "copy" was set before the import, the value of the import data is rounded during the import, and then stored to the common setting value database 336. In the case of P9, a setting item is output to the import result report print as a setting item with a changed value, and thus generation of the import result detail report file involves adding a mark indicating the "setting item with a changed value".

No restriction is intended regarding the specification of the import result report shown in FIG. 6. For example, settings can be replaced with other settings later, and can be changed by selecting, on the UI, an item(s) to be left in the import result report file and an item(s) to be shown in the import result report print. The files shown in FIGS. 5A to 5C are collectively downloaded as one file via the manipulation unit 212 and the network I/F 206.

[Import Result Report Print]

FIG. 7 shows an example of an output result as an import result report print 700. The import result report print 700 is generated with reference to the import result report file shown in FIGS. 5A to 5C. The import result report print 700 is printed by the printer unit 211 in response to a print instruction issued by a user via the manipulation unit 212. Note that a print instruction for an import result can be issued via the manipulation unit 212, regardless of the path taken by the import instruction took.

Import execution information 710 is printed through interpretation of the content of the import result environment report file 510 shown in FIG. 5A. An import result summary 720 is printed through interpretation of the content of the import result summary report file 520 shown in FIG. 5B.

Details of import with changed value 730, as well as details of import with unchanged value 740, is printed through interpretation of the contents of the import result detail report file 530 shown in FIG. 5O. As stated earlier, the import result detail report file lists information of imported setting values, including information of items to be shown in the import result report print and items that are not shown in the import result report print. Furthermore, the items to be shown in the import result report print include items that have different setting values before and after the import, and items that have the same setting value before and after the import. Therefore, the items shown in the import result report print are categorized into the items that have different setting values before and after the import, and the items that have the same setting value before and after the import despite an instruction to change the setting value, so as to be distinguishable to the user. Note that the format of categorized display is not limited to the example shown in FIG. 7, and other layouts may be used. Although printing is used as an exemplary method of outputting the import result report print in the present embodiment, no restriction is intended in this regard. For example, control may be performed to show the categorized setting items separated so as to be distinguishable also when the import result report print is displayed on the display unit or a similar screen, or when the import result report print is output as a file different from the import result report file.

In the examples of FIGS. 5A to 5C, an item having "0" under "print category" is not printed. An item having "1" under "print category" is an item that has different setting values before and after the import, and an item having "2" under "print category" is an item that has the same setting value before and after the import. An item having "3" under "print category" is printed both as an item with a changed value and as an item with an unchanged value. An item having "3" under "print category" corresponds to a menu layer for setting values. Therefore, when there is a menu layer to which both of an item with a changed setting value and an item with an unchanged setting value belong, "3" is registered in correspondence with this menu layer.

[Import Processing Associated with Report Generation]

Figure 8:
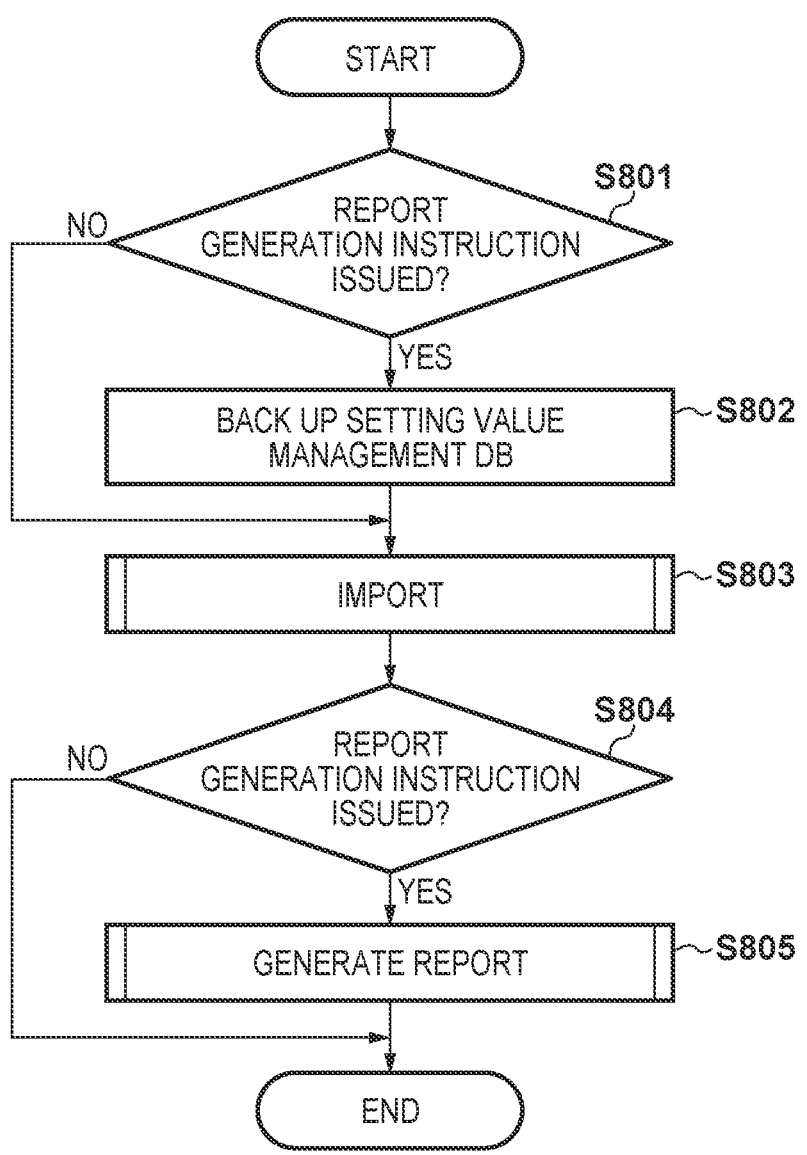
FIG. 8 is a flowchart of overall processing for generating the import result report.

FIG. 8 is a flowchart of overall processing for generating a report during of the import. This processing is realized by the CPU 201 of the image forming device 102 reading out and executing various types of programs stored in the HDD or a similar storage unit.

In step S801, the report management unit 313 of the import/export control module 310 determines whether a report generation instruction was issued during the import. If the report generation instruction was not issued (NO in step S801), processing proceeds to step S803. If the report generation instruction was issued (YES in step S801), in step S802, the report generation unit 335 of the setting management module 330 backs up the common setting value database 336 to store pre-import setting values.

In step S803, the import/export control module 310 executes import processing. This import processing will be described later in detail with reference to FIG. 9.

Once the import processing has been completed, in step S804, the report management unit 313 of the import/export control module 310 again determines whether a report generation instruction was issued during the import. If a report generation instruction was not issued (NO in step S804), processing ends. If the report generation instruction was issued (YES in step 3804), in step S805, the report generation unit 314 of the import/export control module 310 and the report generation unit 335 of the setting management module 330 generate an import result report file. This generation processing will be described later in detail with reference to FIG. 10.

[Import Processing]

Figure 9:
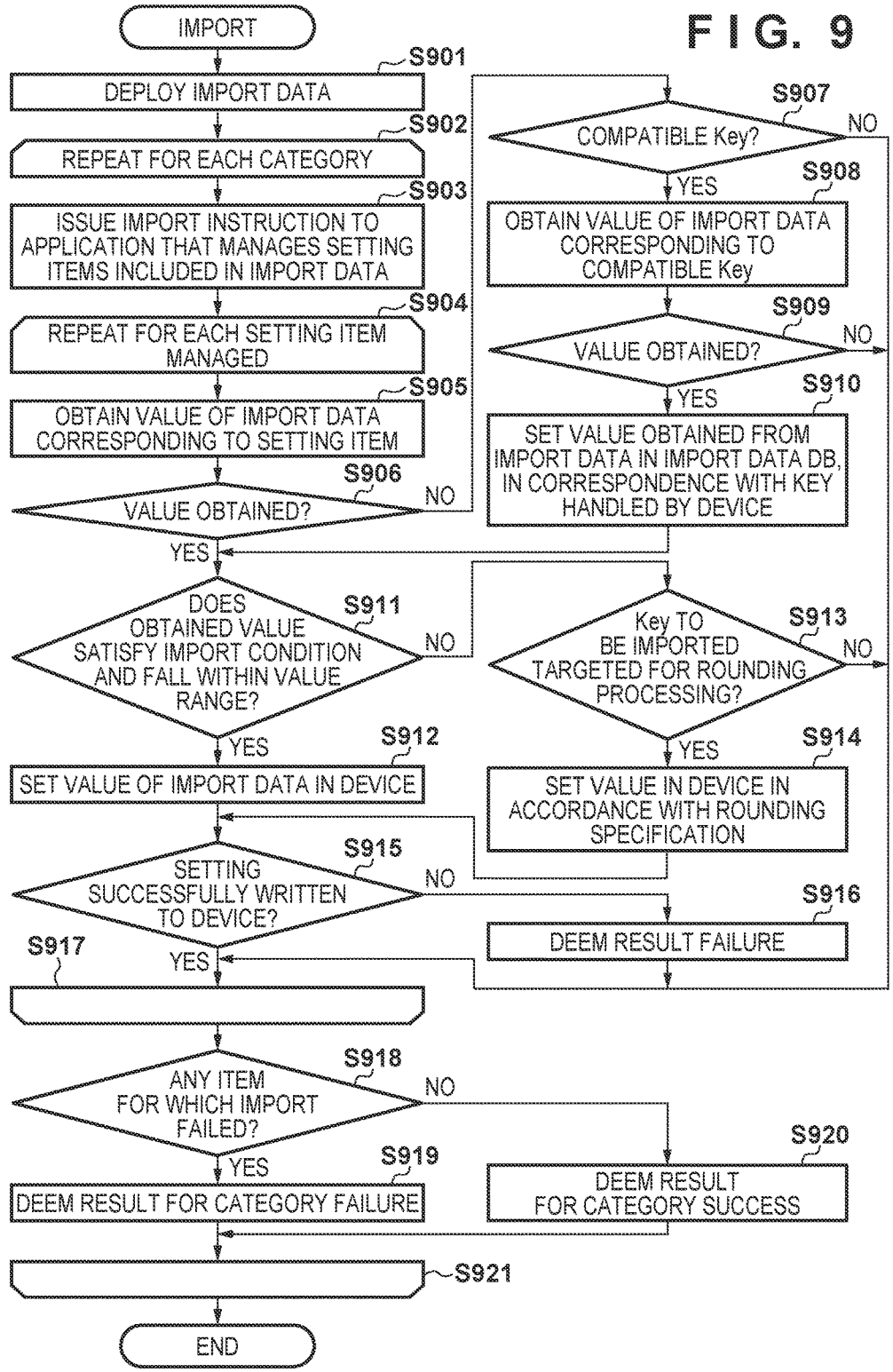
FIG. 9 is a detailed flowchart of import processing.

FIG. 9 is a detailed flowchart of the import processing in step S803 shown in FIG. 8.

In step S901, upon accepting an import instruction, the import/export management unit 312 of the import/export control module 310 requests the data deployment unit 333 of the setting management module 330 to deploy import data. The data deployment unit 333 temporarily deploys the import data to a database in a format that allows for integral read-in from the in-device applications 320.

The import/export management unit 312 of the import/export control module 310 interprets the deployed import data, and determines categories included in the import data. Then, the import/export management unit 312 of the import/export control module 310 repeatedly executes the processing from steps S903 to S920 for each category included in the import data (steps S902 and S921).

In step S903, the import/export management unit 312 issues an import instruction to an in-device application(s) 320 that manages setting items of a category included in the import data.

The in-device application(s) 320 that has received the import instruction repeatedly executes the processing from steps S905 to S916 for each setting item managed therein (steps S904 and S917).

In step S905, the import/export processing unit 321 of the in-device application(s) 320 obtains import data of a managed setting item via the import/export processing unit 334 of the setting management module 330.

In step S906, the import/export processing unit 321 determines whether a value has been obtained from the import data. If the value has been obtained (YES in step S906), processing proceeds to step S911; and if the value has not been obtained (NO in step S906), processing proceeds to step S907. A failure to obtain the value indicates that the import data does not include the value of the setting item.

In step S907, the import/export processing unit 321 of the in-device application(s) 320 determines whether the setting item for which obtainment of the import data was attempted has a compatible key, with reference to the import specification management table 400 shown in FIG. 4. If the setting item does not have a compatible key (NO in step S907), the import data does not include a setting value of the target setting item, and thus processing proceeds to step S917 to execute the import processing with respect to another setting item managed by the in-device application(s) 320. If the setting item has a compatible key (YES in step S907), processing proceeds to step S908.

In step S908, the import/export processing unit 321 obtains a value of the import data corresponding to the compatible key via the import/export processing unit 334 of the setting management module 330.

In step S909, the import/export processing unit 321 determines whether the import data was obtained in step S908. If the value was not obtained (NO in step S909), processing proceeds to step S917 to execute the import processing with respect to another setting item managed by the in-device application(s) 320. If the value was obtained (YES in step S909), processing proceeds to step S910.

In step S910, the import/export processing unit 321 stores the value obtained in step S908 to the database, to which the import data has been temporarily deployed, in correspondence with the original key. Thereafter, processing proceeds to step S911.

In step S911, the import/export processing unit 321 obtains a value range of the setting item registered in the common setting value database 336 via the setting obtainment unit 332. Then, the import/export processing unit 321 determines whether the import data obtained in step S905 or S908 falls within the value range and satisfies an import condition. If the obtained import data falls within the value range and satisfies the import condition (YES in step S911), processing proceeds to step S912; and if not (NO in step S911), processing proceeds to step S913.

In step S912, the import/export processing unit 321 stores the value of the import data obtained in step S905 or S908 to the common setting value database 336. Thereafter, processing proceeds to step S915.

In step S913, the import/export processing unit 321 determines whether the setting value to be imported has a rounding specification with reference to the import specification management table 400 shown in FIG. 4. If the setting value does not have a rounding specification (NO in step S913), the obtained value of the import data is not set in the common setting value database 336, and processing proceeds to step S917 to execute the import processing with respect to another setting value managed by the in-device application(s) 320. If the setting value has a rounding specification (YES in step S913), processing proceeds to step S914.

In step S914, the import/export processing unit 321 rounds the value of the import data obtained in step S905 or S908 to a value within the value range, and stores the rounded value to the common setting value database 336 via the setting reflection unit 331. Thereafter, processing proceeds to step S915.

In step S915, the import/export processing unit 321 determines whether processing for storing the setting value to the common setting value database 336 has been successful based on a return value from the setting management module 330. If the setting value has been stored successfully (YES in step S915), processing proceeds to step S917; and if the storing processing has failed (NO in step S915), processing proceeds to step S916.

In step S916, the import/export processing unit 321 outputs an import result of the target setting value as a failure. Thereafter, processing proceeds to step S917. A failure denotes a case in which writing of the value of the import data to the image forming device 102 failed, or when the obtainment of the value of the import data failed, irrespective of the import data and pre- and post-import setting values. Note that the result is not deemed a failure when the import data does not include the value to be obtained.

Once the import processing has been completed with respect to all setting items managed by the in-device application(s) 320, processing proceeds to step S918, and the import/export management unit 312 determines whether there is any setting item for which the import failed. If there is any setting item for which the import failed (YES in step S918), processing proceeds to step S919; and if there is no setting item for which the import failed (NO in step S918), processing proceeds to step S920.

In step S919, the import/export management unit 312 outputs a summary result for the target category to be imported as a failure. Thereafter, processing proceeds to step S921, and the import processing is executed with respect to another category.

In step S920, the import/export management unit 312 outputs a summary result for the target category to be imported as a success.

Once the import processing has been completed with respect to all categories, processing ends.

[Generation of Import Result Report File]

Figure 10:
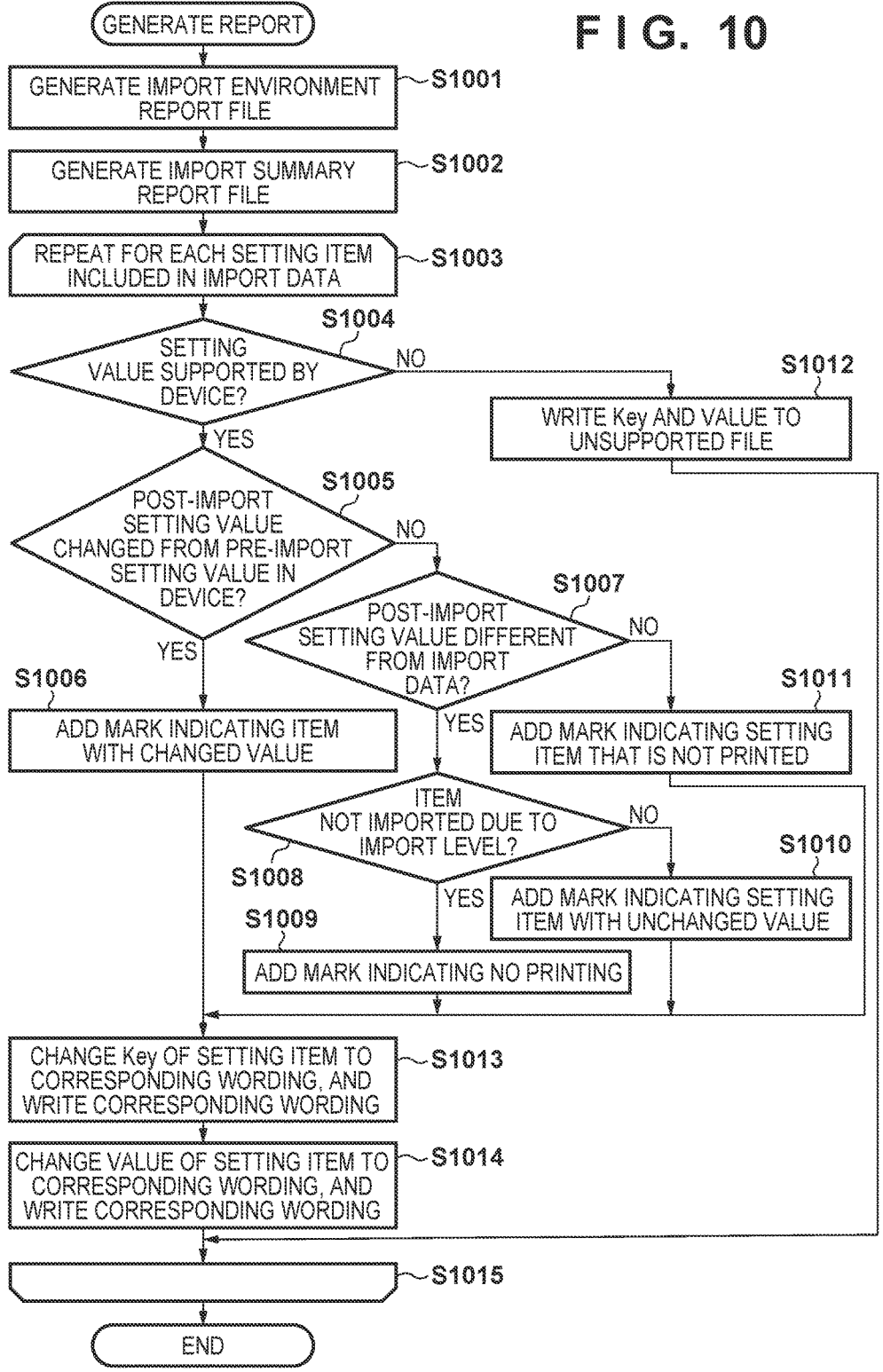
FIG. 10 is a flowchart of processing for generating the import result report file.

FIG. 10 is a detailed flowchart of processing for generating the import result report file in step S805 shown in FIG. 8.

In step S1001, upon accepting a report generation instruction, the report management unit 313 of the import/export control module 310 instructs the report generation unit 314 to generate an import result environment report file. The report generation unit 314 stores information including the time of completion of execution of the import and the name of a user who issued a report instruction as one file.

In step S1002, the report management unit 313 instructs the report generation unit 314 to generate the import result summary report file. For each category to be imported, the report generation unit 314 stores results representing a success or a failure as one file.

The report management unit 313 instructs the report generation unit 335 of the setting management module to generate an import result detail report file. Based on this instruction, in the processing from step S1003, the report generation unit 335 compares the common setting value database that was backed up in step S802, the post-import common setting value database, and the database to which the import data has been temporarily deployed. The report generation unit 335 generates an import result detail report file in accordance with the comparison result. The report generation unit 335 repeatedly executes the processing from steps S1004 to S1014 for each setting item included in the import data. That is to say, the report generation unit 335 of the setting management module 330 executes the following processing for each of the setting values included in the import data.

In step S1004, the report generation unit 335 determines whether the setting value is supported by the image forming device 102 serving as the importing party. If the setting value is supported (YES in step S1004), processing proceeds to step S1005; and if the setting value is not supported (NO in step S1004), processing proceeds to step S1012.

In step S1005, the report generation unit 335 determines whether the setting value has been changed by comparing the pre-import common setting value database with the post-import common setting value database. If the value is the same before and after the import (NO in step S1005), processing proceeds to step S1007; and if the value is different before and after the import (YES in step S1005), processing proceeds to step S1006.

In step S1006, the report generation unit 335 adds a mark indicating that the value of the target setting item before the import is different from the value thereof after the import. Thereafter, processing proceeds to step S1013.

In step S1007, the report generation unit 335 determines whether the value in the post-import common setting value database differs from the value in the database to which the import data has been temporarily deployed. If these values are the same (NO in step S1007), processing proceeds to step S1011, and if these values differ from each other (YES in step S1007), processing proceeds to step S1008.

In step S1011, as the imported setting value is the same as the value that was originally set in the image forming device 102, the report generation unit 335 adds, to the target setting item, a mark indicating that the target setting item is not included in the import result report print. Thereafter, processing proceeds to step S1013.

If it is determined in step S1007 that the value of the post-import common setting value database 336 differs from the value of the import data, it indicates that, for some reason, the setting value to be imported was not reflected. In view of this, in step S1008, the report generation unit 335 determines whether the reason for the value of the import data not being reflected was due to an import level. For example, in the case of a setting value (e.g., an IP address) that can be imported only to an image forming device that has exported this setting value, if this setting value is imported to an image forming device that is different from the image forming device that has exported this setting value, the imported setting value will not be reflected. In this case, the item is determined as an item whose setting value is not imported due to the import level. If the setting value was not reflected due to the import level (YES in step S1008), processing proceeds to step S1009; and if not (NO in step S1008), processing proceeds to step S1010.

If it is determined that the setting value was not reflected due to the import level, processing is compliant with the specification, and thus the report generation unit 335 adds, to the target setting item, a mark indicating that the target setting item is not shown in the import result report print in step S1009. Thereafter, processing proceeds to step S1013.

In step S1010, the report generation unit 335 adds, to the target setting item, a mark to display the target setting item as an item with an unchanged value in the import result report print. Thereafter, processing proceeds to step S1013.

In step S1013, the report generation unit 335 converts a key handling the setting value into the wording on the UI, and writes the name of the setting item to the import result detail report file.

In step S1014, the report generation unit 335 converts the pre-import setting value, the post-import setting value, and the setting value in the import data into the wording on the UI, and writes the wording to the import result detail report file. Thereafter, processing proceeds to step S1015, and processing is executed with respect to another setting item.

In step S1012, the report generation unit 335 writes a key handling the setting item corresponding to the setting value included in the import data, as-is, to a file dedicated to unsupported data, together with the setting value. Thereafter, processing proceeds to step S1015, and processing is executed with respect to another setting item.

Once processing regarding the import result detail report file has been completed with respect to all setting values, processing ends.

[Processing for Generating Import Result Report Print]

Figure 11:
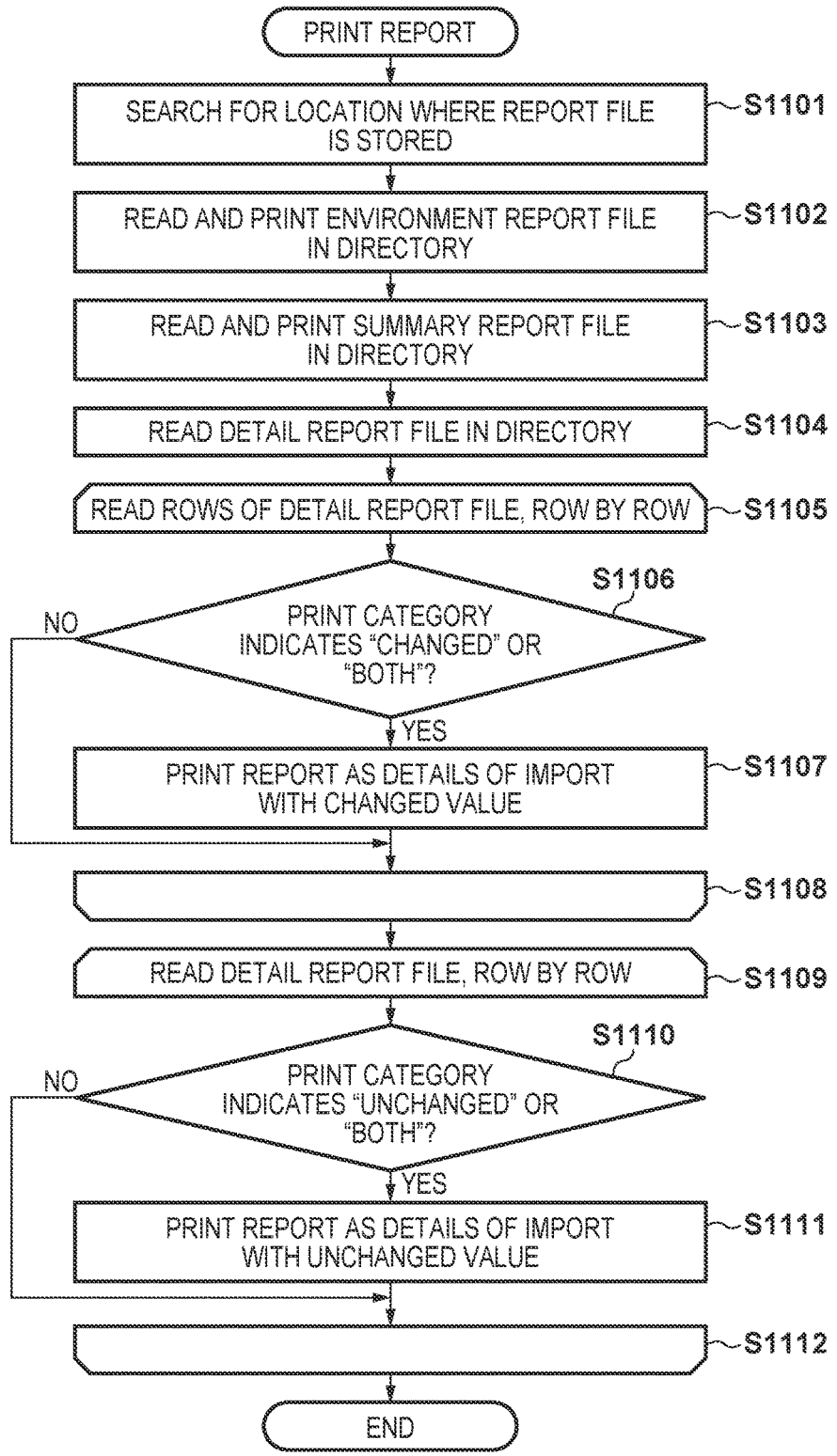
FIG. 11 is a flowchart of processing for generating the import result report print.

FIG. 11 is a flowchart of processing for generating the import result report print with reference to the import result report file. This processing is realized by the CPU 201 of the image forming device 102 reading out and executing various types of programs stored in the HDD or a similar storage unit.

In step S1101, upon receiving an instruction for the import result report print, the report print unit 341 of a report print module 340 queries the report management unit 313 of the import export control module 310 about the storage location of the import result report file.

In step S1102, the report print unit 341 reads the import result environment report file in a directory serving as a designated file storage location, formats the contents described in the file in order, and outputs the formatted contents.

In step S1103, the report print unit 341 reads the import result summary report file in the designated file storage location, formats the contents described in the file in order, and outputs the formatted contents.

In step S1104, the report print unit 341 reads the import result detail report file in the designated file storage location.

The report print unit 341 reads the import result detail report file that was read in step S1104, row by row, and repeats the processing of steps S1106 and S1107 (steps S1105 and S1108).

In step S1106, the report print unit 341 formats and outputs the changed setting values. Then, the report print unit 341 determines whether the print category in the row that has been read indicates "changed setting value" or "both changed setting value and unchanged setting value". If it is determined that the print category indicates neither (NO in step S1106), processing proceeds to step S1108; and if it is determined that the print category indicates one of the two (YES in step S1106), processing proceeds to step S1107.

In step S1107, the report print unit 341 prints a setting item, a pre-import setting value, and a post-import setting value described in the row that has been read as an item under "details of import with changed value". Thereafter, processing proceeds to step S1108.

Once processing has been completed for all rows included in the import result detail report file, processing proceeds to step S1109.

The report print unit 341 reads the import result detail report file, row by row, and repeats the processing of steps S1110 and S1111 (steps S1109 and S1112).

In step S1110, the report print unit 341 checks a mark of the print category in the row that has been read to determine whether the print category indicates "unchanged setting value" or "both changed setting value and unchanged setting value". If it is determined that the print category indicates neither (NO in step S1110), processing proceeds to step S1112; and if it is determined that the print category indicates one of the two (YES in step S1110), processing proceeds to step S1111.

In step S1111, the report print unit 341 prints a setting item, a pre-import setting value, and a post-import setting value described in the row that has been read as an item under "details of import with unchanged value". Thereafter, processing proceeds to step S1112.

Once processing has been completed with respect to all rows included in the import result detail report file, processing ends.

As described above, in outputting the import result report print, setting items described in the import result detail report file are categorized into items that have the same setting value before and after the import despite the import, and items that have different setting values before and after the import.

In the present embodiment, an import result report can be generated that enables a user to clearly grasp which setting item has not been reflected. Clarification of a setting item that has not been reflected prevents a worker from omitting necessary work during set up, and facilitates reflection of an appropriate setting value.

Second Embodiment

A description is now given of another embodiment of the present invention. The first embodiment has depicted an example in which the import result report is generated with regards to imported setting values. Meanwhile, in some cases, the importing of setting values causes values of setting items that have not been imported to change in tandem with the imported setting values. In these cases, as some setting values are changed to unintended values, unintended operations take place. This gives rise to the problem that, as these unintended setting values are not output to the import result report, a worker does not notice the change to the unintended setting values unless he/she actually checks the unintended setting values of the corresponding setting items on the manipulation unit after import.

In order to solve the foregoing problem, the present embodiment depicts a method of managing items that are in tandem with other elements to output setting values that have been changed in tandem with imported setting values to the import result report.

[Import Processing]

Figure 12A:
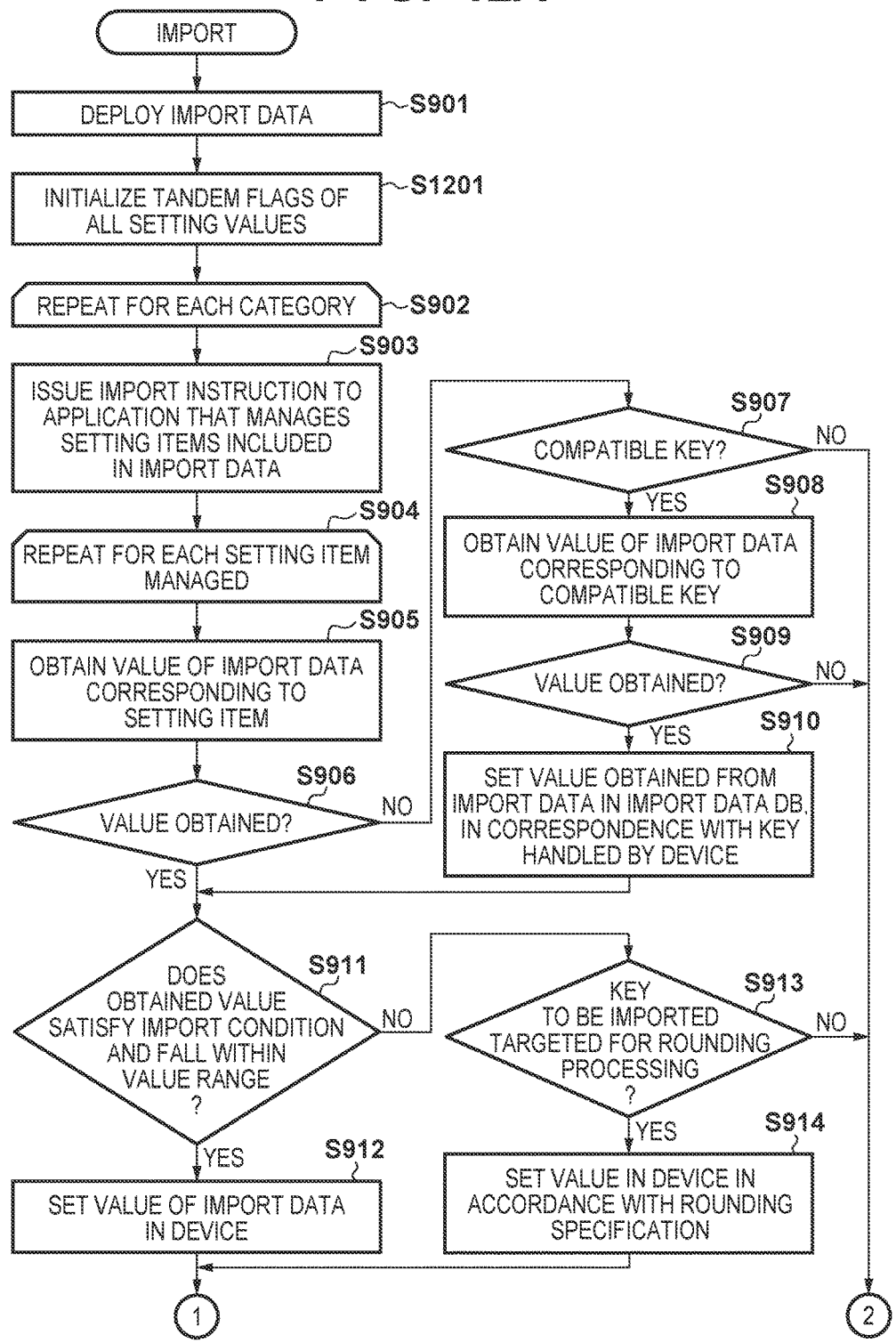
FIGS. 12A and 12B are flowcharts of import processing according to a second embodiment.
Figure 12B:
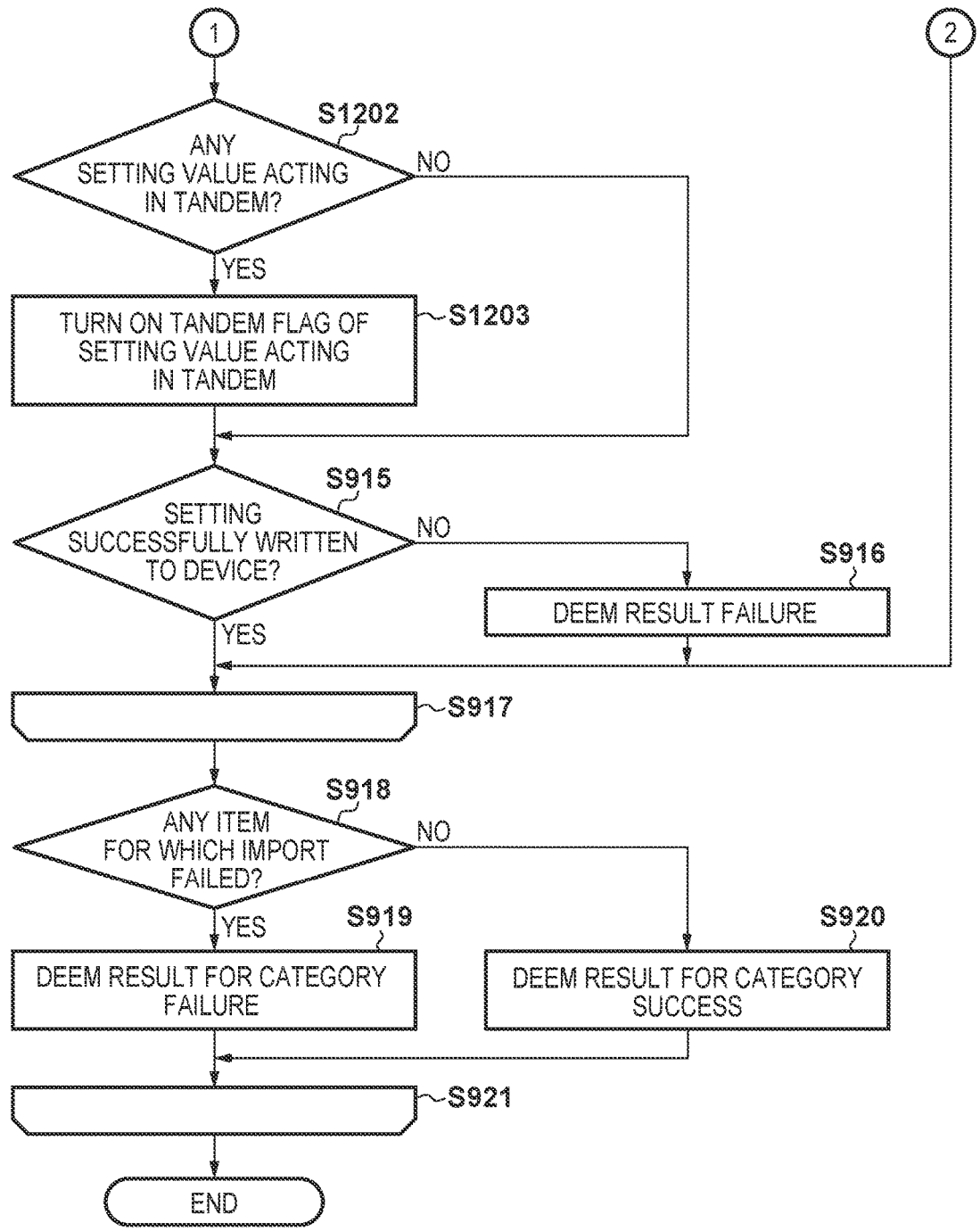

FIGS. 12A and 12B are flowcharts of import processing according to the present embodiment. The following description focuses on differences from the flowchart of FIG. 9. Therefore, a detailed description of overlapping processes will be omitted.

The present embodiment additionally includes processing in which, after a setting value is reflected in the common setting value database 336, a tandem flag is turned ON for a setting value that has been changed in tandem.

In step S901, the data deployment unit 333 of the setting management module 330 temporarily deploys import data to a database.

In step S1201, the import/export management unit 312 of the import/export control module 310 initializes tandem flags of all setting values in the common setting value database 336. Subsequently, the processing from steps S902 to S914 is executed.

After processing of steps S912, S913, and S914, the import/export processing unit 334 of the setting management module 330 determines in step S1202 whether there is any setting value that was changed in tandem with the import data. That is to say, it determines whether any item that was not designated by the import data was changed when the in-device application(s) 320 stored the import data to the common setting value database 336 via the setting reflection unit 331. If it is determined that there is a setting value that was changed in tandem (YES in step S1202), processing proceeds to step S1203; and if it is determined that there is no setting value that was changed in tandem (NO in step S1202), processing proceeds to step S915.

In step S1203, the import/export processing unit 334 turns ON the tandem flag of a setting item corresponding to the setting value that was changed in tandem with the target setting item. Thereafter, processing proceeds to step S915. The tandem flag thus set is used in generating the import result report file.

[Generation of Import Result Report File]

FIG. 13 is a flowchart of processing for outputting, to the import result report file, a setting item whose setting value was changed in tandem with the import data in the present embodiment.

In step S1301, the report management unit 313 of the import/export control module 310 determines whether a report generation instruction was issued during the import. If the report generation instruction was not issued (NO in step S1301), processing proceeds to step S1303; and if the report generation instruction was issued (YES in step S1301), processing proceeds to step S1302.

In step S1302, the report generation unit 335 of the setting management module 330 backs up the common setting value database 336 to store pre-import setting values. Thereafter, processing proceeds to step S1303.

In step S1303, the import/export control module 310 executes the import processing. This step is equivalent to the processing described earlier with reference to FIGS. 12A and 12B.

Once the import processing has been completed, in step S1304, the report management unit 313 of the import/export control module 310 determines again whether a report generation instruction was issued during the import. If a report generation instruction was issued (YES in step S1304), processing proceeds to step S805; and if a report generation instruction was not issued (NO in step S1304), processing ends.

In step S805, the report management unit 313 generates the report. As this step is the same as the processing described in the first embodiment with reference to FIG. 10, a description thereof will be omitted.

Once the report generation processing has been completed, in step S1305, the report generation unit 335 of the setting management module 330 checks the common setting value database 336, and determines whether there is any item whose tandem flag is ON. If there is any setting item whose tandem flag is ON (YES in step S1305), processing proceeds to step S1306; and if there is no setting item whose tandem flag is ON (NO in step S1305), processing ends.

If there is any setting item whose tandem flag is ON, the report generation unit 335 repeatedly executes the processing from step S1307 to step S1310 (steps S1305 and S1310) for each setting item whose tandem flag is ON.

In step S1307, the report generation unit 335 determines whether the common setting value database that was backed up before the import and the post-import common setting value database 336 show a change in the value of the target setting item whose tandem flag is ON. If they do not show a change in the value (NO in step S1307), processing proceeds to step S1311 and then repeated with respect to the next setting item whose tandem flag is ON. If they show a change in the value (YES in step S1307), processing proceeds to step S1308.

In step S1308, the report generation unit 335 checks whether the target setting item is included in the import data. If the target setting item is included in the import data (YES in step S1308), it is already to be included in the import result report, and thus processing proceeds to step S1311 and is then repeated for the next setting item whose tandem flag is ON. If the target setting item is not included in the import data (NO in step S1308), processing proceeds to step S1309.

In step S1309, the report generation unit 335 writes the wording of the setting item, the value of the setting item in the common setting value database that was backed up before the import, and the value of the setting item in the post-import common setting value database 336 to the import result report file.

In step S1310, the report generation unit 335 writes a mark indicating the "setting item with a changed value" as a printer category of the target setting value. Thereafter, processing proceeds to step S1311, and is then repeated for each setting item whose tandem flag is ON in the common setting value database 336.

In the present embodiment, pre- and post-import setting values that are not included in the import data but are changed in tandem with setting values included in the import data can be output to the import result report. The present embodiment enables an explicit presentation of a setting item that underwent an unintended setting change, despite the exclusion of its setting value from the import data, and thus is effective as means for giving notice to a worker in restoring setting values that are not included in the import data to their original states.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126873, filed Jun. 24, 2015, which is hereby incorporated by reference herein in its entirety.

What is claimed is:

1. An information processing device, comprising:
  an import unit configured to set setting items of the information processing device all at once using import data designating a plurality of setting values;
  a generation unit configured to generate a report file regarding a result of an import performed by the import unit; and
  an output unit configured to output information of a setting item that is included in the report file generated by the generation unit and that has been determined as meeting predetermined conditions, wherein
  the predetermined conditions are that there is no change in setting value before and after the import performed by the import unit, and there is a difference between a setting value designated by the import data and a corresponding setting value after the import.

2. The information processing device according to claim 1, wherein
  the output unit uses a printing unit to print out the information of the setting item that has been determined as meeting the predetermined conditions.

3. The information processing device according to claim 1, wherein
  the report file includes a configuration during the import, summary information of a result of the import, and detail information of the result of the import.

4. The information processing device according to claim 1, wherein
  the output unit further outputs a setting item of which the setting value after the import has changed from that of before the import performed by the import unit, separate from the setting item that has been determined as meeting the predetermined conditions so as to be distinguishable to a user.

5. The information processing device according to claim 1, wherein
  the generation unit determines a reason as to why a setting value of a setting item has not been changed to a corresponding setting value designated by the import data through the import performed by the import unit, and includes the reason in the report file, and in accordance with the reason, the output unit switches between performing output and not performing output for each setting item that has been determined as meeting the predetermined conditions.

6. The information processing device according to claim 1, wherein if a setting value of a second setting item that is not designated by the import data has been changed in tandem with a change in a setting value of a first setting item that is designated by the import data through the import performed by the import unit, the generation unit includes information of the second setting item in the report file, and the output unit further outputs information of the second setting item.

7. The information processing device according to claim 1, further comprising:

a management unit configured to manage information regarding a compatibility relationship between setting items; and a determination unit configured to determine, if the information processing device does not include a third setting item designated by the import data, whether the information processing device includes a fourth setting item that has a compatibility relationship with the third setting item and that is not designated by the import data, based on information managed by the management unit, wherein if the determination unit determines that the information processing device includes the fourth setting item, the import unit sets a setting value of the third setting item designated by the import data, with respect to the fourth setting item, and in making the determination about the predetermined conditions, the output unit uses the setting value of the third setting item designated by the import data as a designated setting value of the fourth setting item, and determines a difference through comparison with a setting value of the fourth setting item after the import.

8. A method of controlling an information processing device, the method comprising:

importing in which setting items of the information processing device are set all at once using import data designating a plurality of setting values;

generating a report file regarding a result of an import performed in the importing; and outputting information of a setting item that is included in the report file generated in the generating and that has been determined as meeting predetermined conditions, wherein the predetermined conditions are that there is no change in setting value before and after the import performed by the importing, and there is a difference between a setting value designated by the import data and a corresponding setting value after the import.

9. A non-transitory computer-readable medium storing a program that causes a computer to function as:

an import unit configured to set setting items of the computer all at once using import data designating a plurality of setting values;

a generation unit configured to generate a report file regarding a result of an import performed by the import unit; and an output unit configured to output information of a setting item that is included in the report file generated by the generation unit and that has been determined as meeting predetermined conditions, wherein the predetermined conditions are that there is no change in setting value before and after the import performed by the import unit, and there is a difference between a setting value designated by the import data and a corresponding setting value after the import.

* * * * *